United States Patent
Park et al.

(10) Patent No.: US 9,983,681 B2
(45) Date of Patent: May 29, 2018

(54) METHOD AND APPARATUS FOR DISPLAYING SCREEN IN RESPONSE TO EVENT RELATED TO MOTION OF EXTERNAL OBJECT

(71) Applicant: SAMSUNG ELECTRONICS CO., LTD., Suwon-si (KR)

(72) Inventors: Keun Joo Park, Seoul (KR); Eric Hyunsurk Ryu, Hwaseong-si (KR); Kyoobin Lee, Seoul (KR); Jun Haeng Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/719,607

(22) Filed: May 22, 2015

(65) Prior Publication Data

US 2016/0109955 A1  Apr. 21, 2016

(30) Foreign Application Priority Data

Oct. 21, 2014  (KR) .................. 10-2014-0142449

(51) Int. Cl.
| | | |
|---|---|---|
| G06F 3/01 | (2006.01) | |
| G06F 3/14 | (2006.01) | |
| G06F 3/03 | (2006.01) | |
| G06F 3/0346 | (2013.01) | |
| G06T 7/20 | (2017.01) | |

(52) U.S. Cl.
CPC .............. *G06F 3/017* (2013.01); *G06F 3/011* (2013.01); *G06F 3/0304* (2013.01); *G06F 3/0346* (2013.01); *G06F 3/14* (2013.01); *G06T 7/20* (2013.01); *G06T 2207/10016* (2013.01); *G06T 2207/30201* (2013.01)

(58) Field of Classification Search
CPC . G06F 3/017; G06F 3/14; G06F 3/011; G06F 3/0346; G06F 3/0304; G06T 7/0081; G06T 2207/10016; G06T 7/20
USPC ................................ 345/633, 668, 670, 671
See application file for complete search history.

(56) References Cited

U.S. PATENT DOCUMENTS

| | | | |
|---|---|---|---|
| 6,396,535 B1 | 5/2002 | Waters | |
| 8,478,346 B2 | 7/2013 | Yamazaki | |
| 8,638,230 B2 | 1/2014 | Li et al. | |
| 2009/0300537 A1* | 12/2009 | Park | G01S 19/14 715/778 |
| 2011/0167106 A1* | 7/2011 | Yamada | G01C 21/20 709/203 |
| 2012/0108971 A1* | 5/2012 | Miyama | A61B 8/06 600/443 |

(Continued)

FOREIGN PATENT DOCUMENTS

| | | |
|---|---|---|
| KR | 2000-0061832 A | 10/2000 |
| KR | 10-0469727 B1 | 2/2005 |

(Continued)

*Primary Examiner* — Ke Xiao
*Assistant Examiner* — Kim-Thanh T Tran
(74) *Attorney, Agent, or Firm* — Sughrue Mion, PLLC

(57) ABSTRACT

A method and an apparatus for displaying a screen in response to an event related to a motion of an external object, are provided. The method includes generating an event signal in response a motion of an external object being sensed, sensing a movement of the external object relative to an apparatus based on the event signal, and displaying a screen based on the movement of the external object.

16 Claims, 18 Drawing Sheets

(56) References Cited

U.S. PATENT DOCUMENTS

| | | | | |
|---|---|---|---|---|
| 2012/0194549 A1* | 8/2012 | Osterhout | .......... | G02B 27/0093 345/633 |
| 2012/0200498 A1 | 8/2012 | Quennesson | | |
| 2013/0293447 A1* | 11/2013 | Bickerstaff | .......... | G02B 27/646 345/8 |
| 2013/0336629 A1* | 12/2013 | Mulholland | ............. | H04N 9/87 386/230 |
| 2014/0037139 A1* | 2/2014 | Lee | ........................... | G06T 7/20 382/103 |
| 2015/0177518 A1* | 6/2015 | Wong | .................. | G02B 27/017 345/633 |

FOREIGN PATENT DOCUMENTS

| | | |
|---|---|---|
| KR | 10-0749033 B1 | 8/2007 |
| KR | 10-0751096 B1 | 8/2007 |
| KR | 10-0787565 B1 | 12/2007 |
| KR | 10-2009-0034218 A | 4/2009 |
| KR | 10-2010-0052378 A | 5/2010 |
| KR | 10-2013-0040517 A | 4/2013 |
| KR | 10-2013-0092934 A | 8/2013 |
| KR | 10-2013-0142913 A | 12/2013 |
| KR | 10-2014-0006465 A | 1/2014 |
| WO | 2011104837 A1 | 9/2011 |

\* cited by examiner

300

METHOD AND APPARATUS FOR DISPLAYING SCREEN IN RESPONSE TO EVENT RELATED TO MOTION OF EXTERNAL OBJECT

CROSS-REFERENCE TO RELATED APPLICATION

This application claims priority from Korean Patent Application No. 10-2014-0142449, filed on Oct. 21, 2014, in the Korean Intellectual Property Office, the disclosure of which is incorporated herein by reference in its entirety.

BACKGROUND

1. Field

Methods and apparatuses consistent with exemplary embodiments relate to a method and apparatus for displaying a screen in response to an event related to motion of an external object.

2. Description of the Related Art

A mobile device may visually provide contents to a user through, for example, a screen. For example, while the user carrying the mobile device is moving, the mobile device may provide the contents to the user by displaying the contents on the screen.

A mobile device that is provided to a user may display contents through a stationary screen irrespective of a status of the user. As an example, when the user is located on transportation, for example, a bus or a subway, it may be difficult for the user to identify the contents because the screen displaying the contents is shaken. Accordingly, there is a desire for enhancing readability of contents provided using a mobile device by correcting an error occurring when the mobile device is shaken due to, for example, a movement of a user carrying the mobile device.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method for displaying a screen, the method including generating an event signal in response a motion of an external object being sensed, sensing a movement of the external object relative to an apparatus based on the event signal, and displaying a screen based on the movement of the external object.

The displaying may include moving the screen based on the movement of the external object.

The displaying may include determining at least one of a moving direction, a moving distance, and a moving velocity of the screen based on at least one of a moving direction, a moving distance, and a moving velocity of the external object.

The displaying may include magnifying a region of the screen based on the movement of the external object.

The displaying may include magnifying a region of the screen in response to a moving velocity of the external object being sensed to be greater than a threshold velocity.

The displaying may include moving the screen in response to a moving velocity of the external object being sensed to be less than or equal to a threshold velocity.

The displaying may include displaying the screen based on a number of times that the external object is shaken during a period of time.

The generating may include generating the event signal in response to an event being sensed, and the sensing may include generating an event map including a map element corresponding to the event signal, determining, based on the event map, an optical flow including a velocity vector corresponding to the map element, and sensing the movement of the external object based on the determined optical flow.

The sensing may include generating an event frame by storing the event signal during a time window. The sensing may include extracting a region of interest (ROI) from the event frame, determining an optical flow corresponding to the ROI, and sensing the movement of the external object based on the determined optical flow.

The sensing may include generating an event frame by storing the event signal during a time window. The sensing may include extracting an ROI from the event frame, and sensing the movement of the external object based on a movement of the ROI.

The method may further include sensing an acceleration of the apparatus, and sensing a tilt of the apparatus. The displaying may include displaying the screen based on the acceleration, the tilt, and the movement of the external object.

A non-transitory computer-readable recording medium may store a program to implement the method.

According to an aspect of an exemplary embodiment, there is provided an apparatus including an event sensor configured to generate an event signal in response to a motion of an external object being sensed, a processor configured to sense a movement of the external object relative to the apparatus based on the event signal, and a display configured to display a screen based on the movement of the external object.

The display may be configured to move the screen based on the movement of the external object.

The display may be configured to magnify a region of the screen based on the movement of the external object.

The display may be configured to display the screen based on a number of times that the external object is shaken during a period of time.

The event sensor may include sensing elements, each of which is configured to generate the event signal in response to a event being sensed, and the processor may be configured to generate an event map including a map element corresponding to the event signal, determine, based on the event map, an optical flow including a velocity vector corresponding to the map element, and sense the movement of the external object based on the determined optical flow.

The processor may be configured to generate an event frame by storing the event signal during a time window. The processor may be configured to extract an ROI from the event frame, determine an optical flow corresponding to the ROI, and sense the movement of the external object based on the determined optical flow.

The processor may be configured to generate an event frame by storing the event signal during a time window. The processor may be configured to extract an ROI from the event frame, and sense the movement of the external object based on a movement of the ROI.

The apparatus may further include an acceleration sensor configured to sense an acceleration of the apparatus, and a tilt sensor configured to sense a tilt of the apparatus. The display may be configured to display the screen based on the acceleration, the tilt, and the movement of the external object.

The display may be a head mounted display configured to be mounted on a head of a user to display the screen.

BRIEF DESCRIPTION OF THE DRAWINGS

The above and other aspects will become apparent and more readily appreciated from the following detailed description of certain exemplary embodiments, taken in conjunction with the accompanying drawings of which.

DETAILED DESCRIPTION

Figure 1:
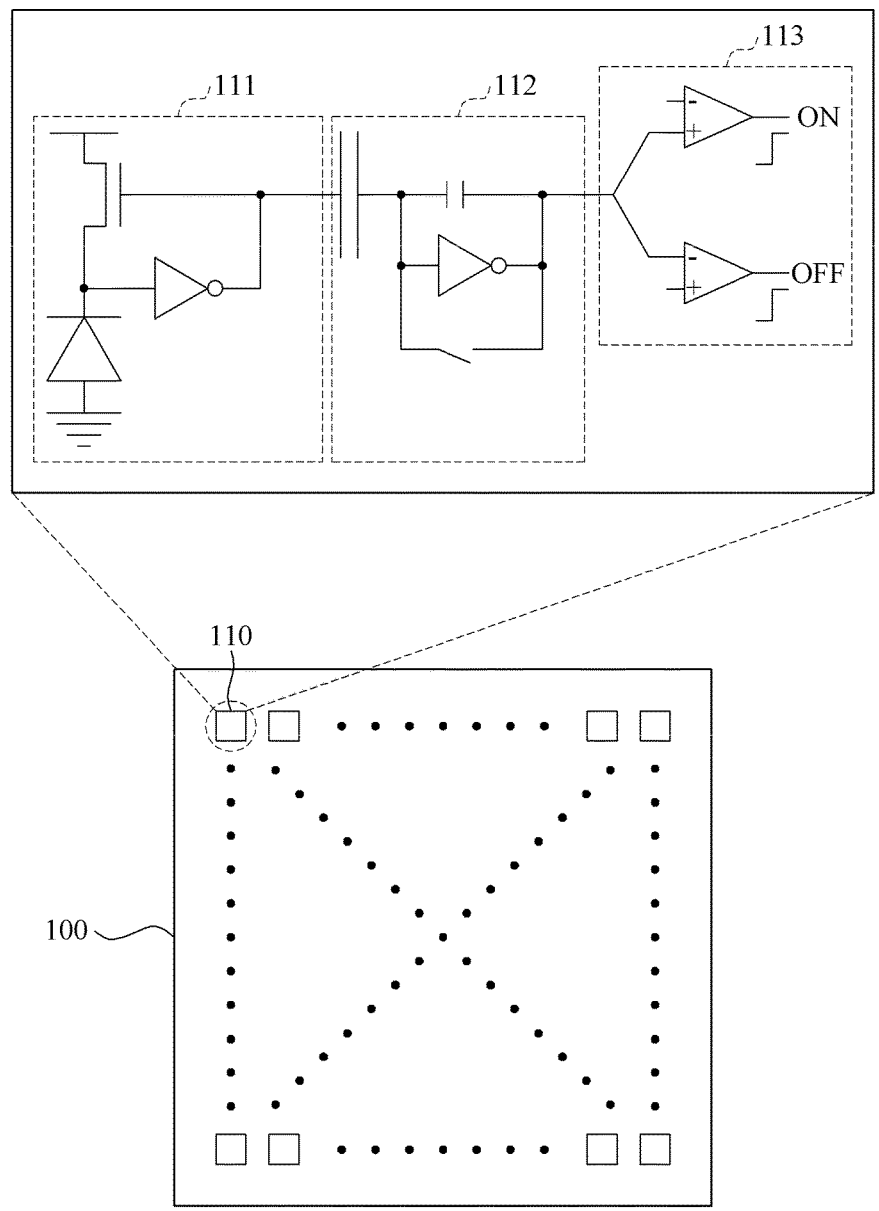
FIG. 1 is a diagram illustrating a configuration of an event-based sensor according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

FIG. 1 is illustrates a configuration of an event-based sensor 100 according to an exemplary embodiment.

The event-based sensor 100 includes a plurality of sensing elements including a sensing element 110. For example, the event-based sensor may include 128×128 sensing elements including the sensing element 110.

The sensing element 110 outputs an event signal by sensing an occurrence of a predetermined event. For example, the sensing element 110 includes three stages.

An electrical signal is output in a first stage 111. In this example, the electrical signal may be proportional to an intensity of light incident into the sensing element 110. For example, a current or a voltage proportional to the intensity of light may be generated in the first stage 111. In FIG. 1, the current may be generated in the first stage 111.

In a second stage 112, a signal obtained by amplifying a change in the intensity of light is output. For example, in the second stage 112, a DC component of the electrical signal output from the first stage 111 may be removed using a capacitor. A variation of the electrical signal output from the first stage 111 may be amplified in the second stage 112.

An ON event signal or an OFF event signal is output in a third stage 113. For example, the ON event signal may be output in the third stage 113 when an increment of the electrical signal amplified in the second stage 112 is greater than a threshold variation. When a decrement of the electrical signal amplified in the second stage 112 is greater than the threshold variation, the OFF event signal may be output in the third stage 113.

In exemplary embodiments, the event may include, for example, an event in which intensity of light is changed. For example, the event may be sensed and output by an event-based vision sensor configured to capture an external object.

The event-based vision sensor may non-time-synchronously output an event signal in response to sensing a change in the intensity of incident light. For example, when a sensing element 110 of the event-based vision sensor senses an event in which the intensity of light increases, the sensing element 110 may output an ON event. Also, when the sensing element 110 of the event-based vision sensor senses an event in which the intensity of light decreases, the sensing element 110 may output an OFF event.

In contrast to a frame-based vision sensor, the event-based vision sensor may output an event signal through the sensing element 110 sensing a change in the intensity of light in lieu of scanning a photodiode output from each pixel on a frame-by-frame basis. The change in the intensity of light may occur due to a motion of the external object or the event-based vision sensor.

For example, when a light source is practically fixed by a lapse of time, and when the external object does not emit light by itself, light incident into the event-based vision sensor may be light generated from the light source and reflected by the external object. When the external object, the light source, and the event-based vision sensor do not move, light reflected by the external object in a stationary state may not be changed in practice and thus, the change in the intensity of light incident into the event-based vision sensor may not occur. Conversely, when the external object is moving, the light reflected by the moving external object may be changed based on the motion of the external object and thus, the change in the intensity of light incident into the event-based vision sensor may occur.

The event signal output in response to the motion of the external object may include information generated non-time-synchronously. In this example, the information may be similar to an optic nerve signal transferred from a retina to a brain. For example, the event signal may not be generated with respect to a stationary object, and may be generated in response to sensing a moving object.

As an example, when an intensity of light is increased by at least a predetermined amount in a third sensing element, the event-based vision sensor may output a bit indicating an ON event and an address of the third sensing element. As another example, when an intensity of light is increased by at least a predetermined amount in a fourth sensing element, the event-based vision sensor may output a bit indicating an OFF event and an address of the fourth sensing element. In this example, an address for each sensing element may be expressed by, for example, a number, a position, and/or an index.

The event-based vision sensor may also output a time at which the change in the intensity of light occurs. In this example, the event-based vision sensor may include a timer. A processor configured to process a signal output from the event-based vision sensor may receive the time. In another example, the event-based vision sensor may not output a time at which the change in the intensity of light occurs. In this example, the processor may set a point in time at which an event signal is received, as the time at which the change in the intensity of light occurs.

Hereinafter, the event-based sensor 100 and the event-based vision sensor may also be referred to as an event sensor in exemplary embodiments. Since the event sensor applies time information and an address of the sensing element 110 in which the intensity of light is changed, a quantity of processed information may be reduced when compared to a general image camera.

Figure 2:
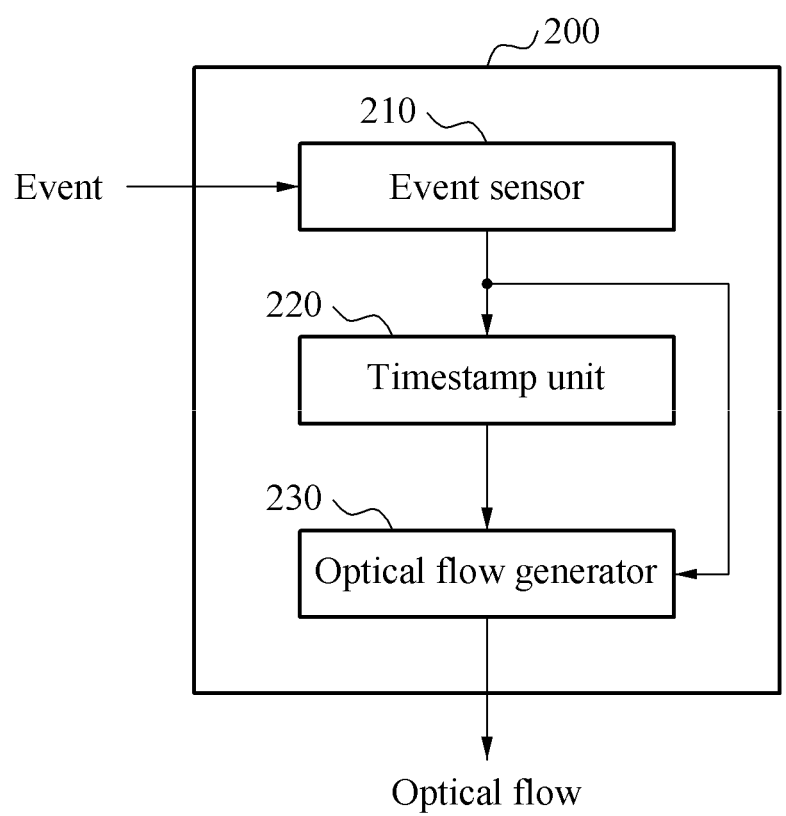
FIG. 2 is a block diagram illustrating an event-based processing apparatus according to an exemplary embodiment.

FIG. 2 is a block diagram illustrating an event-based processing apparatus 200 according to an exemplary embodiment.

Referring to FIG. 2, the event-based processing apparatus 200 includes an event sensor 210, a timestamp unit 220, and an optical flow generator 230.

The event sensor 210 generates an event signal by sensing an occurrence of a predetermined event. For example, the event sensor 210 may include a plurality of sensing elements. Among the plurality of sensing elements, at least one target sensing element sensing the occurrence of the event may output an event signal. The event signal may be an asynchronous signal based on the predetermined event, and include information of the at least one target sensing element in which the predetermined event occurs.

As an example, information of a target sensing element may include, for example, an address and an index of the target sensing element.

In this example, the predetermined event may include, for example, an event in which an intensity of light is increased by at least a predetermined value during a unit time interval and an event in which the intensity of light is decreased by at least a predetermined value during a unit time interval.

Accordingly, the event-based processing apparatus 200 may perform an image processing on an event signal output from a target sensing element having a predetermined event, for example, an event related to an intensity for each sensing element, thereby reducing a number of operations when compared to a scheme of performing a processing on all pixels for each frame.

For example, when an intensity of light incident into a first sensing element positioned at (3, 10) increases to be greater than or equal to a predetermined value, the event sensor 210 may output an event signal including an address of the first sensing element. Also, when an intensity of light incident into a second sensing element positioned at (20, 20) increases to be greater than or equal to the predetermined value, the event sensor 210 may output an event signal including an address of the second sensing element.

The timestamp unit 220 receives the event signal output from the event sensor 210.

The timestamp unit 220 generates timestamp information by mapping at least one map element corresponding to the event signal and a time, for example, a timestamp, at which the event signal is output. For example, the timestamp information may be generated in a form of an event map.

In this example, the event map may include a plurality of map elements. The plurality of map elements may correspond to the plurality of sensing elements included in the event sensor 210. For example, a predetermined map element may include a timestamp of a corresponding sensing element.

Based on the information of the target sensing element, the timestamp unit 220 may store a time at which a new event occurs, for example, a time at which the target sensing element outputs a new event signal, in a map element corresponding to the target sensing element in the event map.

For example, the timestamp unit 220 may store the time at which the new event occurs for each of the plurality of map elements included in the event map based on the received event signal.

Thus, the timestamp information generated by the timestamp unit 220 may include information of a most recent time at which an event signal is output from each of the plurality of sensing elements.

In an example, the timestamp unit 220 may maintain information of the most recent time at which an event signal is output from each of the plurality of sensing elements. Based on information, for example, the information of the target sensing element, included in the received event signal, the timestamp unit 220 may update the time stored in the map element corresponding to the target sensing element with the time at which the new event occurs, for example, the time at which the new event signal is output.

The timestamp unit 220 may be implemented by software, hardware, or a combination of software and hardware. For example, the timestamp unit 220 may be implemented by a processor, a memory, a hardware accelerator (HWA), a field-programmable gate array (FPGA), or combinations thereof.

Accordingly, the event-based processing apparatus 200 may perform a processing based on an event signal output from each sensing element last without consideration of a history of events occurring by a lapse of time. Through this, the event-based processing apparatus 200 may provide technology for performing a processing based on a relatively small number of operations and a relatively low capacity of memory.

Figure 3:
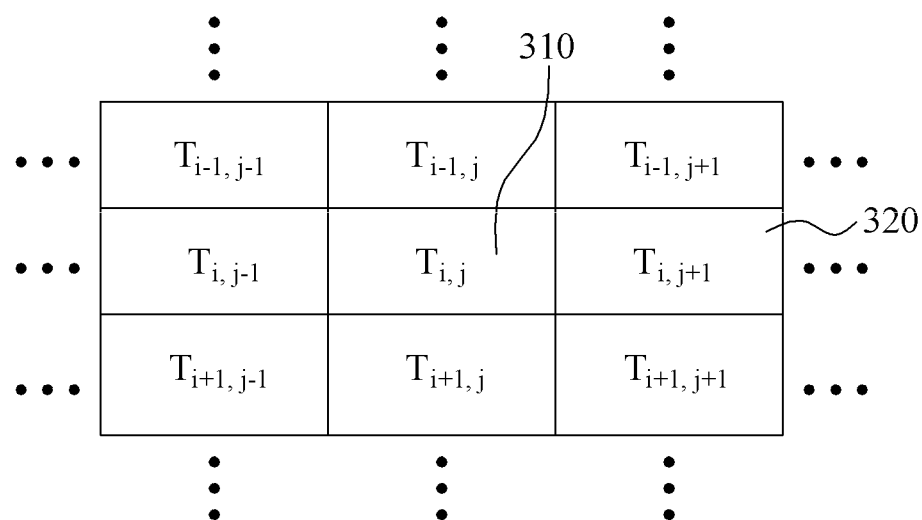
FIGS. 3 and 4 are diagrams illustrating timestamp information according to an exemplary embodiment.
Figure 4:
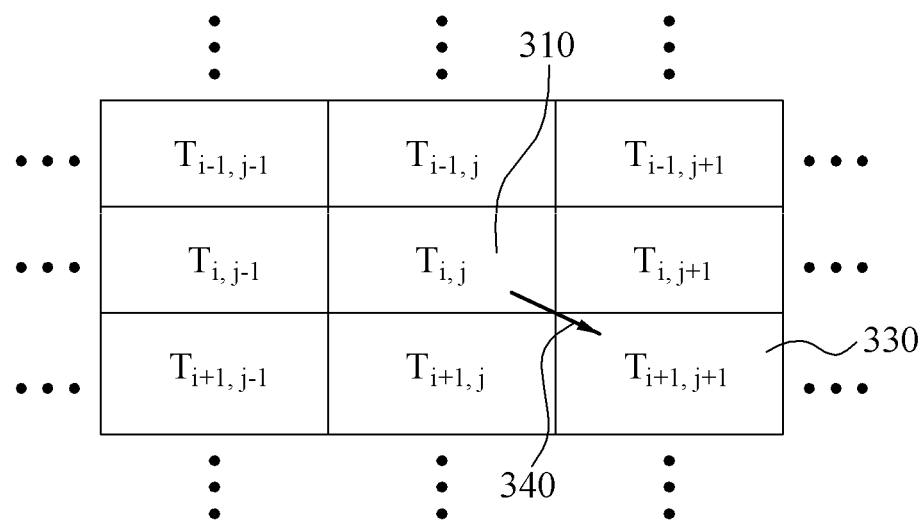

Related descriptions about the timestamp information generated by the timestamp unit 220 will also be provided with reference to FIGS. 3 and 4.

The optical flow generator 230 generates an optical flow based on the timestamp information generated by the timestamp unit 220 in response to the event signal output from the event sensor 210. Hereinafter, the timestamp information may be provided in a form of the event map.

The optical flow generator 230 may be implemented by software, hardware, or a combination of software and hardware. For example, the optical flow generator 230 may be implemented by a processor, a memory, an HWA, an FPGA, or combinations thereof.

In this example, the optical flow may include a velocity vector of at least one map element corresponding to the new event signal in the event map. For example, the optical flow may include a velocity vector corresponding to the map element related to at least one target sensing element among the plurality of map elements.

The velocity vector may be a two-dimensional (2D) vector having a predetermined magnitude and a predetermined direction on a 2D plane including the plurality of map elements. A start position of the velocity vector may be a position of a corresponding map element. For example, the position of the corresponding map element may be a position of the map element related to the target sensing element on the event map.

As an example, when the event sensor 210 is moved relative to an external object or the external object is moved relative to the event sensor 210, the intensity of light incident into the plurality of sensing elements may be changed such that the target sensing element sensing an occurrence of an event may output the event signal. The timestamp unit 220 may generate an event map in which the map element corresponding to the target sensing element is updated in response to the outputting of the event signal. The optical flow may include a movement of a point at which the event signal is output in the event map, as a form of the 2D vector.

Figure 5:
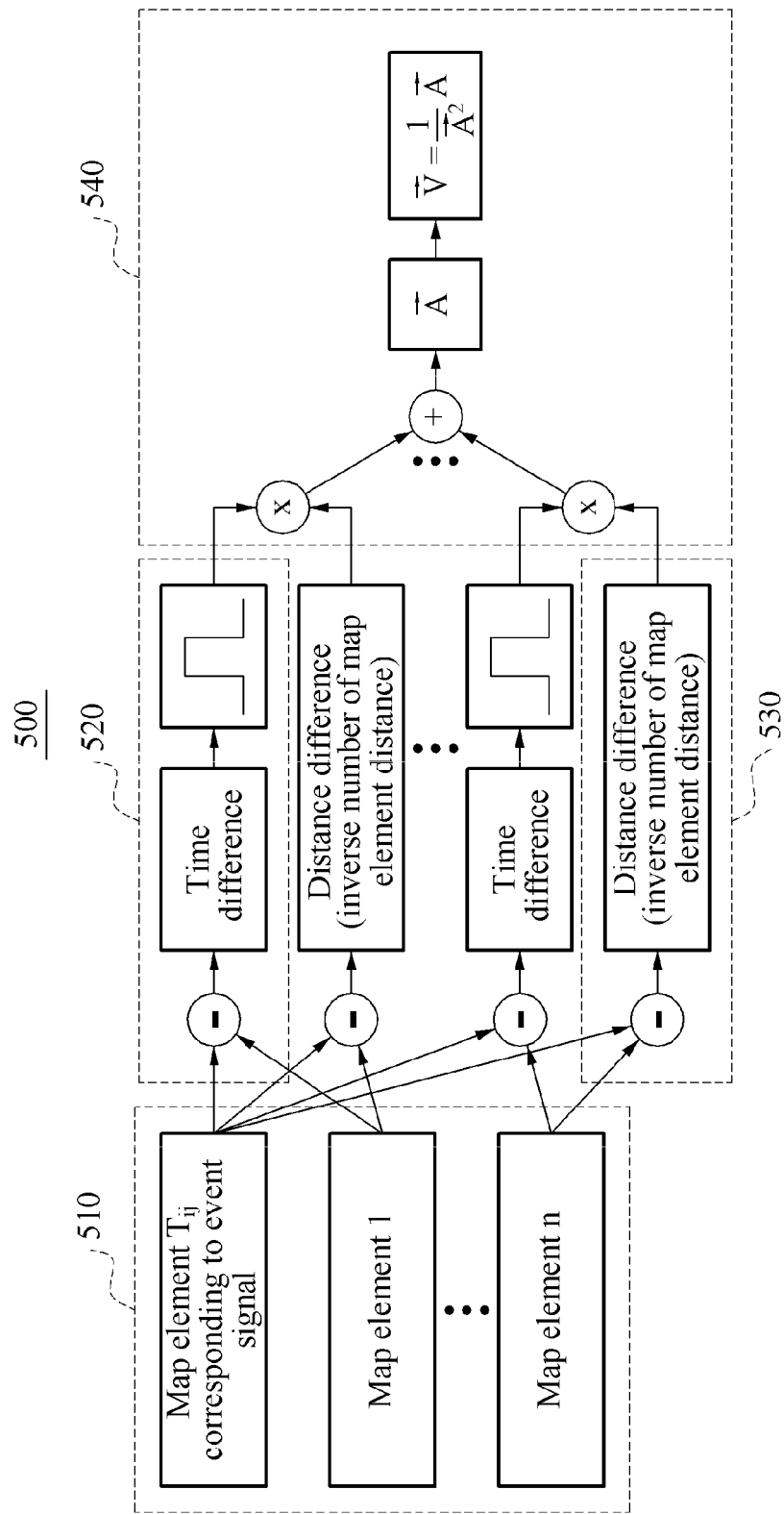
FIG. 5 is a block diagram illustrating an optical flow generator included in an event-based apparatus according to an exemplary embodiment.

Related descriptions about a configuration of the optical flow generator 230 and an operation of generating the optical flow by using the optical flow generator 230 based on the timestamp information will also be provided with reference to FIG. 5.

FIGS. 3 and 4 are diagrams illustrating timestamp information 300 according to an exemplary embodiment.

Referring to FIG. 3, time information corresponding to each of a plurality of map elements is stored in the timestamp information 300.

As described with reference to FIG. 2, the timestamp information 300 may maintain information of a most recent time at which an event signal is output from each sensing element.

For example, $T_{i,j}$ may indicate a most recent time at which an event signal corresponding to a map element 310 positioned at (i, j) is output, and $T_{i,j+1}$ may indicate a most recent time at which an event signal corresponding to a map element 320 positioned at (i, j+1) is output.

The timestamp unit 220 of FIG. 2 may update the timestamp information 300 based on an event signal received from the event sensor 210. In this example, the timestamp unit 220 may perform an update of only a map element corresponding to a target sensing element from which the event signal is output in lieu of performing the update of all map elements.

A sensing element of the event sensor 210 may sense whether a predetermined event occurs based on a unit of a microsecond (μs). In this example, the timestamp unit 220 may store a time at which a new event occurs, in an event map for each map element corresponding to the sensing element on a μs-by-μs basis.

Referring to FIG. 4, an event-based processing apparatus may compute a velocity vector of at least one map element based on the timestamp information 300 to generate an optical flow.

As an example, an event signal may be output from a sensing element corresponding to the map element 310 positioned at (i, j) and then, an event signal may be output from a sensing element corresponding to a map element 330 positioned at (i+1, j+1). In this example, the map element 310 positioned at (i, j) may store a time $T_{i,j}$, and the map element 330 positioned at (i+1, j+1) may store a time $T_{i+1,j+1}$ having a greater value than a value of the time $T_{i,j}$.

In this example, the event-based processing apparatus may compute a 2D vector $\vec{A}$ (not shown) having a start position at a position of the map element 310 based on the timestamp information.

For example, the event-based processing apparatus may extract a time difference and a position difference to compute the 2D vector $\vec{A}$ (not shown) from the timestamp information. In this example, the time difference may be a difference between the time $T_{i,j}$ and the time $T_{i+1,j+1}$, and may be expressed as a scalar $\Delta t$ (not shown). Also, the position difference may be a difference between positions of the map element 330 and the map element 310, and may be expressed as a 2D vector $\vec{d}$ 340.

The event-based processing apparatus may compute the 2D vector $\vec{A}$ (not shown) using Equation 1.

$$\vec{A} = \vec{d} \cdot \Delta t \frac{1}{\|\vec{d}\|^2} \qquad \text{[Equation 1]}$$

Additionally, the event-based processing apparatus may compute 2D vectors having start points at positions of other map elements similarly to the aforementioned scheme. The event-based processing apparatus may output an optical flow including a set of the 2D vectors.

FIG. 5 is a block diagram illustrating an optical flow generator 500 included in an event-based apparatus according to an exemplary embodiment.

Referring to FIG. 5, the optical flow generator 500 includes a neighboring map element acquirer 510, a time difference computer 520, a distance difference computer 530, and an optical flow computer 540.

Each module of FIG. 5 may be implemented by software, hardware, or a combination of software and hardware. For example, each of the neighboring map element acquirer 510, the time difference computer 520, the distance difference computer 530, and the optical flow computer 540 included in the optical flow generator 500 may be implemented by a processor, a memory, an HWA, an FPGA, or combinations thereof.

The neighboring map element acquirer 510 acquires a plurality of neighboring map elements based on a map element $T_{ij}$ corresponding to an event signal. For example, the map element corresponding to the event signal may be a map element corresponding to a target sensing element from which the event signal is output.

In an example, the neighboring map element acquirer 510 may acquire eight neighboring map elements directly neighboring the map element corresponding to the event signal. In another example, the neighboring map element acquirer 510 may additionally acquire 16 neighboring map elements surrounding the eight neighboring map elements as well as the eight neighboring map elements.

The time difference computer 520 computes information of a time difference between the map element corresponding to the event signal and each of the neighboring map elements of the map element, based on the timestamp information 300 of FIG. 3.

For example, the time difference computer 520 may compute a time difference between the map element corresponding to the target sensing element from which the event signal is output and each of the neighboring map elements of the map element. As an example, the event signal may be output from the sensing element corresponding to the map element 310 of FIG. 3. The time difference computer 520 may compute a time difference between the time $T_{i,j}$ stored in the map element 310 and the time $T_{i+1,j+1}$ stored in the map element 320 neighboring the map element 310.

In this example, a value of the time $T_{i,j}$ stored in the map element 310 may be updated by the timestamp unit 220 of FIG. 2 in response to an occurrence of a new event and thus, a value of $T_{i,j}-T_{i,j+1}$ may be greater than or equal to "0". For example, when an event signal is simultaneously output from a sensing element corresponding to the map element 320, the value of $T_{i,j}-T_{i,j+1}$ may be "0".

The time difference computer 520 may compute the time difference for each of the plurality of neighboring map elements acquired by the neighboring map element acquirer 510.

As an example, when the computed time difference is beyond a predetermined time window range, for example, 0.1 seconds, the time difference computer 520 may output "0" in lieu of the computed time difference.

Concisely, the time difference computer 520 may count the computed time difference as meaningless information when the computed time difference is beyond the predetermined time window range.

Through this, the optical flow generator 500 may remove a factor affecting the velocity vector corresponding to each map element included in the event map as noise.

The distance difference computer 530 computes information of a distance difference between the map element corresponding to the sensing element from which the event signal is output and each of the neighboring map elements of the map element.

For example, the distance difference computer 530 may compute an inverse number of a map element distance between the map element corresponding to the sensing element from which the event signal is output and each of the neighboring map elements. In this example, the map element distance may include a normalized distance among the plurality of map elements. For example, a pixel distance between the map element 310 and the map element 320 of FIG. 3 may be "1".

The distance difference computer 530 may compute the inverse number of the map element distance for each of the plurality of neighboring map elements acquired by the neighboring map element acquirer 510.

The optical flow computer 540 computes an optical flow based on the information of the distance difference computed by the distance difference 530 and the information of the time difference computed by the time difference computer 520.

Based on the information of the distance difference and the information of the time difference, the optical flow computer 540 may compute a 2D vector A corresponding to the map element related to the sensing element from which the event signal is output, and divide the 2D vector A by an inner product value of the 2D vector A to compute the optical flow.

For example, the optical flow computer 540 may multiply the information of the distance difference to the information of the time difference, corresponding to each of the map elements neighboring the map element corresponding to the event signal. Subsequently, the optical flow computer 540 may compute the 2D vector A by summing up results of multiplying the information corresponding to each of the neighboring map elements. In this example, a unit of the 2D vector A may be "time/distance".

The optical computer 540 may compute a velocity vector V included in the optical flow by dividing the 2D vector A by the inner product value of the 2D vector A. In this example, a unit of the velocity vector V may be "distance/time"

The optical flow computer 540 may compute the velocity vector V for each map element corresponding to the event signal, thereby generating the optical flow including the velocity vector for each map element corresponding to the event signal.

As described above, the time difference computer 520 may output "0" when the time difference between the map element corresponding to the event signal and one of the neighboring map elements is beyond the predetermined time window. When all time differences between the map element corresponding to the event signal and the neighboring map elements are beyond the predetermined time window, the 2D vector A computed by the optical flow computer 540 may be "0".

In this example, the optical flow computer 540 may output "0" as a computed value of the velocity value V in lieu of infinity.

Although not shown in FIG. 5, the optical flow generator 500 may include at least one of a partial computer and a full computer.

In this example, in response to outputting of the event signal, the partial computer may asynchronously compute a new optical flow for the map element corresponding to the sensing element from which the event signal is output among all map elements included in the event map, and each of the neighboring map elements of the map element. For example, the partial computer may compute velocity vectors for at least one map element corresponding to the event signal among all of the map elements included in the event map and neighboring map elements of the at least one map element.

The full computer may compute a new optical flow for all of the map elements at a predetermined interval. For example, the full computer may determine whether the predetermined interval arrives and, in response to an arrival of the predetermined interval, compute velocity vectors for all of the map elements.

Since the descriptions provided with reference to FIG. 5 are also applicable here, repeated descriptions with respect to the partial computer and the full computer will be omitted for increased clarity and conciseness.

Figure 6:
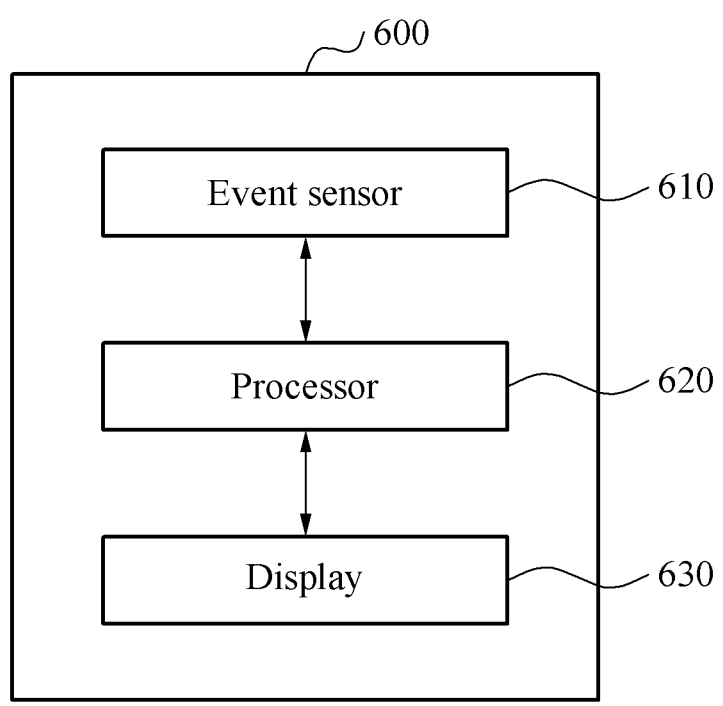
FIG. 6 is a block diagram illustrating an apparatus for displaying a screen in response to an event related to a motion of an external object according to an exemplary embodiment.

FIG. 6 is a block diagram illustrating an apparatus 600 for displaying a screen in response to an event related to a motion of an external object according to an exemplary embodiment.

The apparatus 600 for displaying a screen in response to an event related to a motion of an external object includes an event sensor 610, a processor 620, and a display 630. The apparatus 600 may be any electronic apparatus, for example, a smartphone, a tablet PC, and a desktop PC, including the display 630. Also, the apparatus 600 may be combined with the event-based processing apparatus 200 of FIG. 2.

The event sensor 610 senses at least a portion of an external object in which a motion occurs and, outputs at least one event signal in response to the sensing. For example, the event sensor 610 may be the event sensor 210 of FIG. 2.

In this example, the motion of the external object may be a relative motion between the apparatus 600 and the portion of the external object. The relative motion may include, for example, a case in which the apparatus 600 moves relative to the portion of the external object in a stationary state, a case in which the portion of the external object moves relative to the apparatus 600 in a stationary state, and a case in which the apparatus 600 and the portion of the external object move differently from one another.

In this example, a relative movement of the external object to the apparatus 600 may be a result of the motion of the external object. The relative movement may indicate, for example, a change in a relative position of the external object to the apparatus 600. As an example, the relative position may indicate, for example, a change in a position of the external object on a 2D coordinate system to the apparatus 600, and a change in a position of the apparatus 600 on a 2D coordinate system to the external object.

In this example, the external object may indicate an object positioned in an external area of the apparatus 600. The external object may include, for example, a portion or an entirety of a human body, a face of a human, an animal, and a material.

The processor 620 senses the movement of the external object based on the output event signal. For example, the processor 620 may sense the movement of the external object by computing an optical flow based on the event signal. In this example, to compute the optical flow, the processor 620 may include the timestamp unit 220 and the optical flow generator 230 of FIG. 2, or may perform operations of the timestamp unit 220 and the optical flow generator 230. Also, the processor 620 may compute the optical flow based on the event signal by performing an operation of the optical flow generator 500 of FIG. 5.

The processor 620 may identify a region of interest (ROI) from an event frame generated based on the event signal, and sense the movement of the external object by tracking the identified ROI. In this example, the event frame may indicate a set of event signals included in a predetermined time window. For example, the predetermined time window may be set as a time interval between 10 and 30 milliseconds (ms); however, a length of the time interval is not limited thereto. Instead, the length of the time interval may vary based on a design. Related descriptions about an example of the event frame will be provided with reference to FIG. 14.

As an example, the processor 620 may sense the movement of the external object by sensing a movement of a position corresponding to a center, for example, a centroid, of the identified ROI. Also, the processor 620 may compute an optical flow for the ROI, and sense the movement of the external object based on the computed optical flow.

Hereinafter, in exemplary embodiments, the ROI may refer to a region including a subject of interest in a set, for example, the event frame, including event signals corresponding to the predetermined time window and at least one event signal. The ROI may indicate, for example, a region including a face of a human, a region including a portion of a human body, a region including an animal, and a region including a material.

The processor 620 controls the display 630 to display a screen based on the movement of the external object. As an example, the processor 620 may control the display 630 such that the screen is displayed on a different scheme based on a feature, for example, a velocity, a direction, and a frequency, in the movement of the external object. In this example, the processor 620 may control the display 630 such that a portion of the screen is magnified, or the screen is moved, based on the movement of the external object. Descriptions related to the scheme for displaying the screen will be provided with reference to FIG. 9.

The display 630 displays the screen based on the movement of the external object. For example, the display 630 may change the screen being displayed under a control of the processor 620 operating based on the movement of the external movement.

In an example, the apparatus 600 may provide a smart motion stay. The smart motion stay may indicate, for example, a function to display such that a user identifies the screen while the user is on a move or a body of the user is shaken. For example, the smart motion stay may allow the user to view an image or read letters on a display of a mobile device while the display is shaken due to a motion of the user.

For example, the apparatus 600 may sense a face of a user using an event sensor disposed on a front side surface of the apparatus 600. When the user is on the move or in a traveling bus, the user may not appropriately identify contents on the display without a change in the screen due to a shaken body of the user. The apparatus 600 may recognize a moving direction and a moving distance of the face which is being shaken, to move the screen in a moving direction of the face or magnify contents, for example, letters, on the screen viewed by the user, thereby enhancing readability.

The motion of the user may be inappropriately sensed by a general vibration sensor, a gyro sensor, and a tilt sensor. A motion of a body part, for example, a hand of the user, used to support the apparatus 600 may differ from a motion of another body part, for example, the face, used to gaze at the apparatus 600. In general, since a frame rate of a color-based image sensor is approximately 30 ms per second and a relatively complex algorithm, for example, color filtering, edge filtering, and template matching, is used to recognize the face, a total response time of the color-based image sensor may be greater than or equal to 50 ms. Thus, a generally used sensor may not respond to a user moving at a rate higher than 50 ms.

The apparatus 600 may sense the motion of the user on a µs-by-µs basis, using the event sensor 610 to provide a screen appropriate for the motion of the user. For example, the event sensor 610 may immediately output an event signal in response to a change in an intensity of light incident into each sensing element. The event sensor 610 may perform an asynchronous event-based operation in lieu of a synchronous frame-based operation. The event sensor 610 may provide a response time less than or equal to 1 ms.

Figure 7:
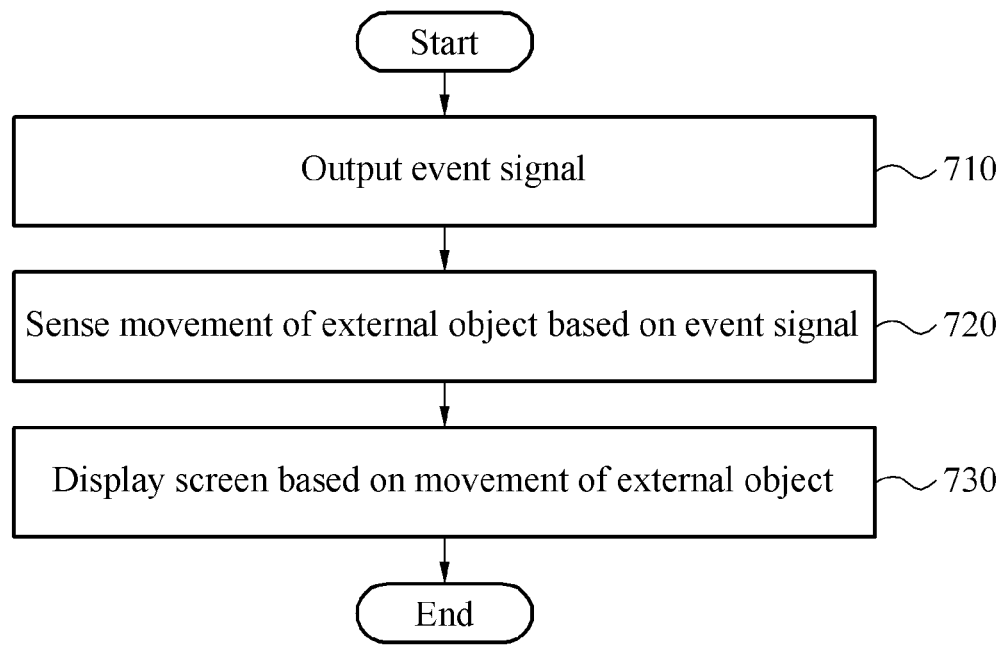
FIG. 7 is a flowchart illustrating a method of displaying a screen in response to an event related to a motion of an external object according to an exemplary embodiment.

FIG. 7 is a flowchart illustrating a method of displaying a screen in response to an event related to a motion of an external object according to an exemplary embodiment.

In operation 710, an event sensor outputs an event signal. The event sensor may output at least one event signal in response to an occurrence of a predetermined event sensed by any of a plurality of sensing elements included in the event sensor. For example, the event sensor may output an event signal by sensing a change in an intensity of light incident into any of the sensing elements.

In operation 720, a processor senses a movement of an external object relative to the event sensor based on the event signal. The relative movement may include, for example, a case in which the external object moves and a case in which the event sensor moves. The processor may sense the movement of the external object and the movement of the event sensor by tracking a movement of an ROI or computing an optical flow based on the event signal. Hereinafter, descriptions about an example of sensing a movement by computing an optical flow will be provided with reference to FIG. 10, and descriptions about an example of sensing a movement by tracking an ROI will be provided with reference to FIGS. 11 and 13. Hereinafter, descriptions will be provided based on a case in which the external object moves as an example.

For example, the processor may compute the optical flow using Equation 1 based on time information of the event signal output from the event sensor. The processor may compute a velocity vector V by dividing a 2D vector A computed through Equation 1, by an inner product value of the 2D vector A as described in, for example, the operation of the optical flow computer 540 of FIG. 5. The processor may compute an x-axial velocity and a y-axial velocity of a map element based on the computed velocity vector V.

The processor may use the optical flow to compute a moving velocity of the external object as described above. Additionally, the processor may compute a moving velocity based on the ROI. For example, the processor may compute the moving velocity based on an optical flow of the ROI. Also, the processor may sense a motion, for example, a spin, of the external object based on a proportional change of a feature point, for example, an eye, an eyebrow, and a lip, on a face of a user.

In operation 730, a display displays the screen based on the movement of the external object relative to the apparatus.

As an example, the processor may control the display to display the screen by moving the screen based on to the movement of the external object. In this example, the processor may control the display to move the screen when a moving velocity of the external object is sensed to be less than or equal to a predetermined threshold velocity. Also, the processor may determine at least one of a moving direction, a moving distance, and a moving velocity for the screen based on at least one of a moving direction, a moving distance, and the moving velocity of the external object. For example, the predetermined threshold velocity may be set by the user or automatically set in advance.

The processor may control the display to display the screen by magnifying at least a partial region of the screen based on the movement of the external object. In this example, the processor may control the display to display the screen by magnifying at least a partial region of the screen when the moving velocity of the external object is sensed to be greater than the predetermined threshold velocity.

In this example, the processor may change a display scheme of the screen based on a moving feature of the external object. The moving feature may be determined based on, for example, the moving velocity, the moving direction, and the moving distance of the external object and a number of times that the external object is shaken in a unit time, for example, one second.

For example, a case in which the moving velocity of the external object is sensed to be greater than the predetermined threshold velocity may indicate a case in which the external object moves at a relatively high velocity. Conversely, a case in which the moving velocity of the external object is sensed to be less than or equal to the predetermined threshold velocity may indicate a case in which the external object moves at a relatively low velocity.

Also, when a number of times that the external object is shaken during a predetermined reference period of time, for example, the unit time, is sensed to be greater than a predetermined threshold frequency, the movement of the external object may be, for example, a high frequency movement. When the number of times that the external object is shaken during the predetermined reference period of time is sensed to be less than or equal to the predetermined threshold frequency, the movement of the external object may be, for example, a low frequency movement. In this example, a state in which the external object is shaken may indicate a state in which the external object repetitively moves within a relatively short distance.

As an example, an apparatus for displaying a screen in response to an event related to a motion of an external object may magnify a portion of a screen to enhance readability when the external object is sensed as moving at a relatively high velocity. Also, the apparatus may move the screen based on the movement of the external object to enhance the readability when the external object is sensed as moving at a relatively low velocity.

As another example, an apparatus for displaying a screen in response to an event related to a motion of an external object may display a screen based on a number of times that the external object is shaken during a predetermined reference period of time. For example, the apparatus may magnify a portion of the screen to enhance the readability when the movement of the external object is sensed as a high frequency movement. Also, the apparatus may move the screen based on the movement of the external object to enhance the readability when the movement of the external object is sensed as a low frequency movement.

A screen display scheme changing based on a moving feature of the external object is not limited to the foregoing. Instead, the display scheme, such as magnifying a portion of a screen and moving the screen, may be selectively changed as needed.

Figure 8:
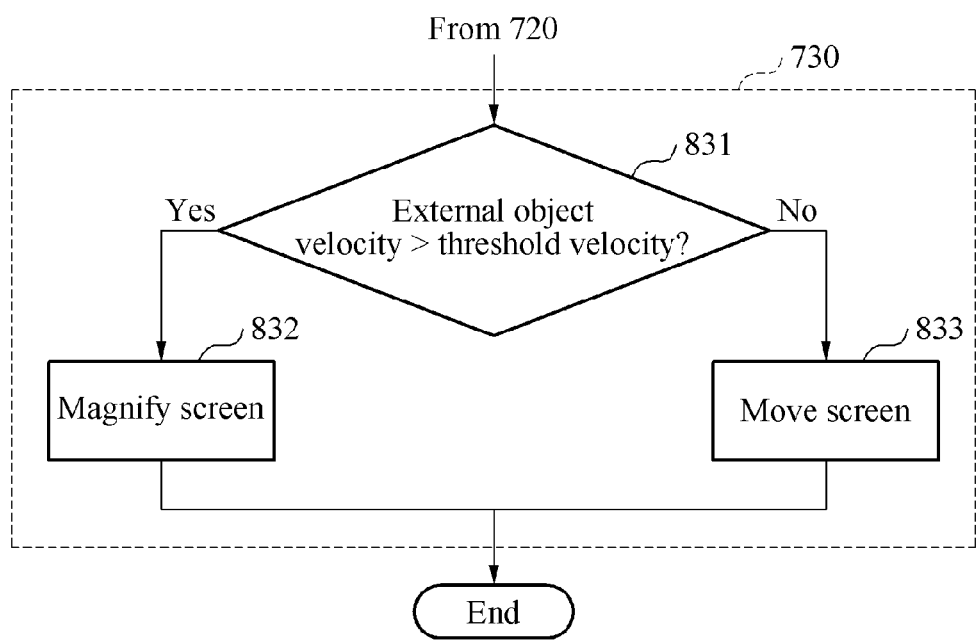
FIG. 8 is a flowchart illustrating a method of displaying a screen based on a movement of an external object according to an exemplary embodiment.

FIG. 8 is a flowchart illustrating a method of displaying a screen based on a movement of an external object according to an exemplary embodiment.

In operation 831, a processor determines whether a velocity of the external object is greater than a predetermined threshold velocity. In this example, the processor may compute a moving velocity, a moving direction, and a moving distance of the external object based on an event signal. The moving velocity may be computed based on the method described in operation 720 of FIG. 7. The moving distance may be computed based on the moving velocity.

In this example, the processor determines a display scheme of the screen based on the moving velocity of the external object. For example, when the moving velocity of the external object is determined to be greater than the predetermined threshold velocity, in operation 832, the processor magnifies the screen. When the moving velocity of the external object is determined to be less than or equal to the predetermined threshold velocity, in operation 833, the processor moves the screen. As such, the display scheme is changed based on a moving feature of the external object in operations 832 and 833, thereby enhancing readability.

As an example, in operation 832, the processor magnifies the screen. The processor may control a display to magnify at least a partial region of the screen. In this example, the partial region may be determined as a central region of the screen or a region at which a line of sight of a user arrives. Through this, the user may easily identify contents, for example, letters, positioned at the magnified partial region. The magnified partial region is not limited thereto, and may be changed based on a design as needed.

As an example, in operation 833, the processor moves the screen. The processor may control the display to move the screen based on the movement of the external object. In this example, a moving velocity of the screen may be determined to be proportional, for example, identical, to the moving velocity of the external object. A moving direction of the screen may correspond to the moving direction of the external object. The processor may determine a moving distance, for example, a displacement, of the screen to be proportional to the moving distance of the external object. In this example, the moving distance of the screen may be determined as described below.

For example, the processor may compute a displacement of the screen based on a velocity vector computed in operation 831 as shown in Equation 2. In this example, the velocity vector may include information of the moving direction and the moving velocity of the external object.

$$x_t = x_{t-1} + V_x \Delta T_e / C_s$$

$$y_t = y_{t-1} + V_y \Delta T_e / C_s \quad \text{[Equation 2]}$$

In Equation 2, t denotes a current time window and t−1 denotes a previous time window. A time window may be a unit time interval for segmenting events and set based on a unit of, for example, ms. $V_x$ denotes an average x-axial velocity of a map element, and $V_y$ denotes an average y-axial velocity of the map element. For example, $V_x$ and $V_y$ may indicate an average velocity of pixels corresponding to an event included in the current time window. $\Delta T_e$ denotes a difference between an average time of a previous event data packet, for example, a set of events included in the previous time window, and an average time of a current event data packet, for example, a set of events included in the current time window. $C_s$ may be a sensitivity constant automatically determined or set by the user. For example, when the sensitivity constant $C_s$ is large, the displacement of the moving screen may increase in response to a relatively small change. $x_t$ and $y_t$ denote displacements of the screen moving in the current time window.

Figure 9:
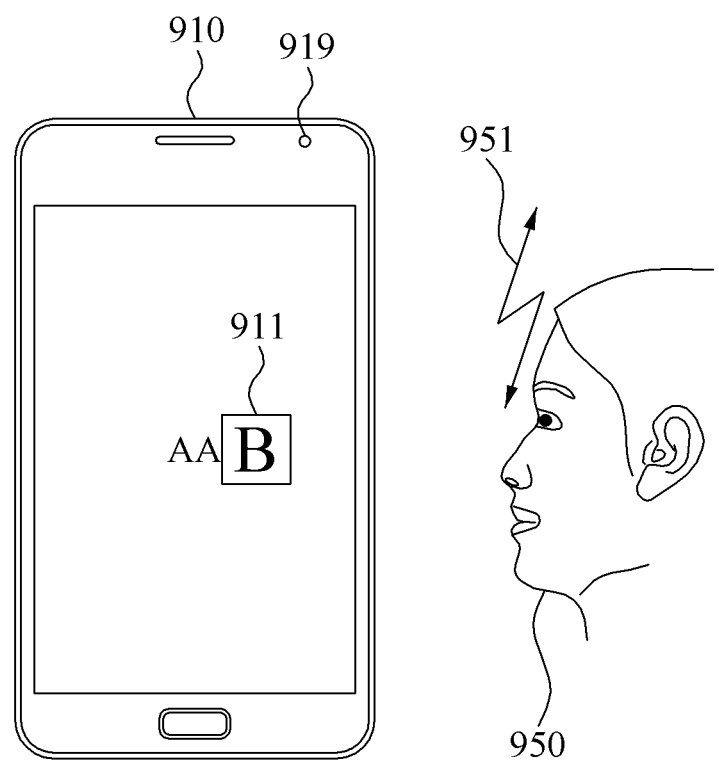
FIGS. 9 and 10 are diagrams illustrating a process of displaying a screen according to exemplary embodiments.
Figure 10:
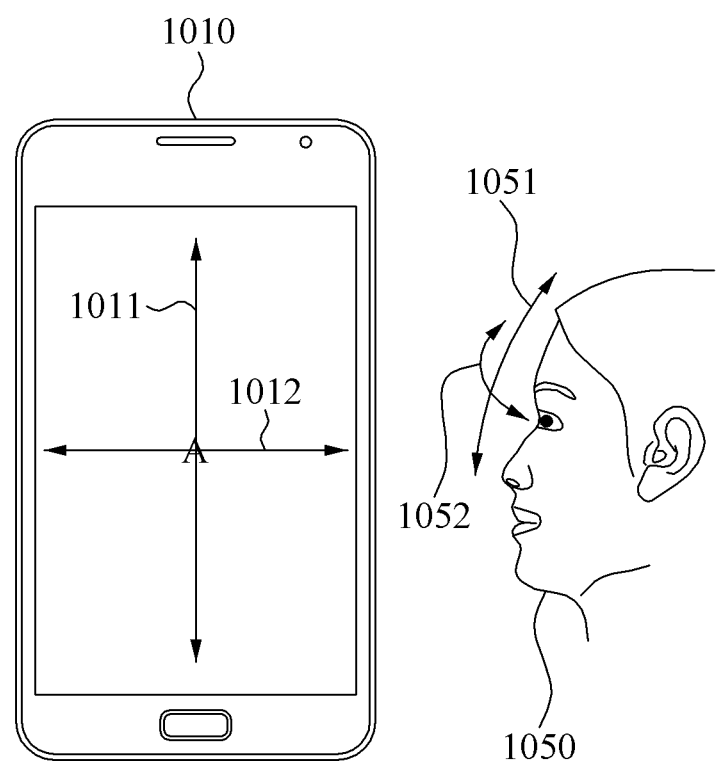

FIGS. 9 and 10 are diagrams illustrating a method of displaying a screen according to exemplary embodiments.

Referring to FIG. 9, a screen is displayed based on, for example, a high velocity movement or a high frequency movement of an external object. In this example, the external object is a face 950 of a user. In this example, the event sensor 919 may be disposed on a front side portion or a rear side portion of an apparatus 910. The event sensor 919 may be disposed on an identical side or an opposite side to a display of the apparatus 910.

As an example, when the face 950 of the user is shaken at a high frequency, the user may have difficult fixing a line of sight at one point on the display of the apparatus 910. In this example, when the apparatus 910 provides contents through a relatively small region, the user may have difficulty identifying the contents.

In this example, when the apparatus 910 senses that the face 950 of the user is shaken at a high frequency as indicated by a bidirectional arrow 951, the apparatus 910 displays the screen by magnifying a partial region 911 of the screen. However, a position, a size, and a magnified degree of the partial region 911 are not limited to the example described with reference to FIG. 9. Instead, a position, a size, and a magnified degree of the partial region 911 may be changed based on a design.

Referring to FIG. 10, a screen may be displayed based on, for example, a low velocity movement or a low frequency movement of an external object. In this example, the external object is a face 1050 of a user.

As an example, in response to a movement of the face 1050 in a predetermined direction, the user may change a line of sight based on a position of the face 1050 to identify contents, which may cause a visual fatigue to the user. An apparatus 1010 moves the screen based on a relative movement between the face 1050 and the apparatus 1010, thereby reducing a degree of shaking the screen and enhancing readability of the screen despite the movement of the user.

In an example, in response to sensing that the user moves the face 1050 at a low velocity based on a first axis 1051, the apparatus 1010 displays the screen to move based on a first axis 1011. In response to sensing that the user moves the face 1050 at a low velocity based on a second axis 1052, the apparatus 1010 displays the screen to move based on a second axis 1012. For example, in response to sensing that the user moves the face 1050 along the second axis 1052 in a rightward direction relative to the user, "A", a letter displayed in the screen of FIG. 10, may be displayed to move along the second axis 1012 in the rightward direction relative to the user.

In FIG. 10, directions of the first axes 1011 and 1051 and directions of the second axes 1012 and 1052 are provided as an example and thus, may be changed based on a design. Also, an additional axis, for example, a z axis, may be used.

FIGS. 11 through 15 are diagrams illustrating methods of sensing a movement of an external object according to exemplary embodiments.

Figure 11:
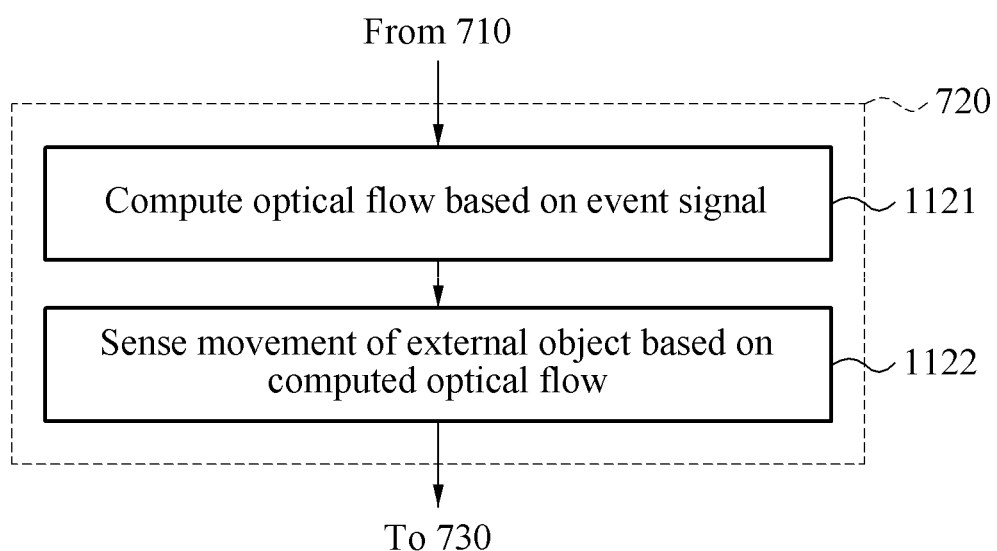
FIGS. 11 through 15 are diagrams illustrating a method of sensing a movement of an external object according to exemplary embodiments.

FIG. 11 is a flowchart illustrating a method of sensing a movement of an external object by computing an optical flow.

In operation 1121, a processor computes an optical flow based on an event signal. For example, the processor may generate an event map including a plurality of map elements corresponding to a plurality of sensing elements. The processor may compute the optical flow including a velocity vector corresponding to each of the map elements in the event map based on the event signal. In this example, the velocity vector may be computed based on Equation 1 and the operation of the optical flow computer 540 as described with reference to FIG. 5.

In operation 1122, the processor senses a movement of an external object based on the computed optical flow. For example, the processor may compute a moving distance, a moving direction, and a moving velocity of the external object based on the computed optical flow. The moving direction and the moving velocity of the external object may be extracted as components of the velocity vector, and the moving distance of the external object may be computed based on a difference between or multiplication of an average time and the extracted moving velocity.

Figure 12:
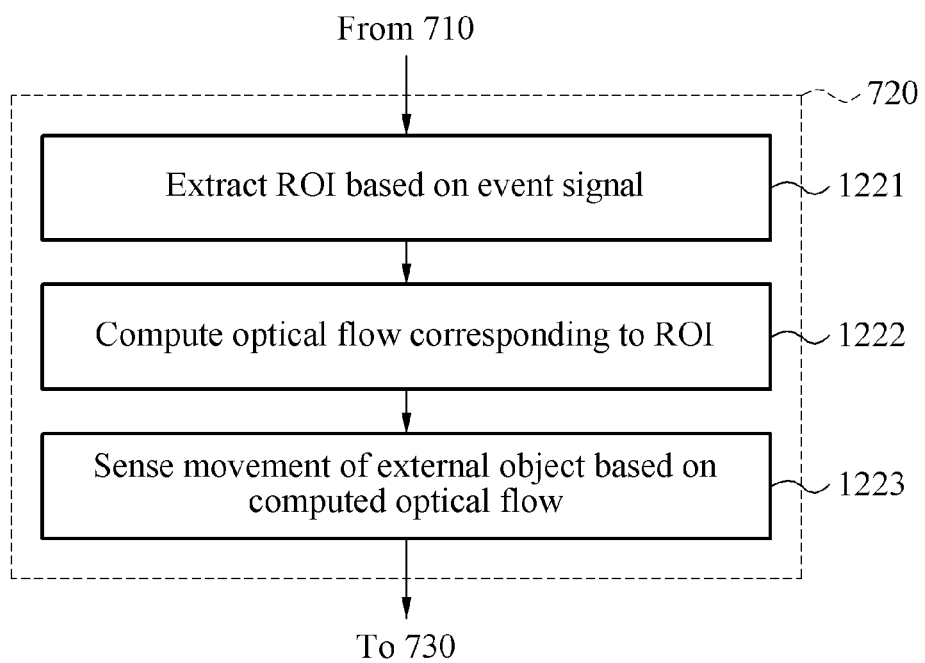

FIG. 12 is a flowchart illustrating a method of sensing a movement of an external object based on an optical flow of an ROI.

In operation 1221, a processor extracts an ROI based on an event signal.

For example, the processor may generate an event frame by storing an event signal during a predetermined time window. The processor may extract a feature vector of an oriented gradient feature from the generated event frame. The feature vector may include an orientation angle and a gradient amplitude. Related descriptions about the feature vector will also be provided with reference to FIG. 13.

The processor may detect the ROI based on the feature vector. As an example, the processor may detect the ROI from the feature vector based on a machine learning algorithm, for example, a support vector machine (SVM) and an artificial neural network (ANN). The processor may distinguish the ROI and a background region from the event frame based on the above machine learning algorithm. In this example, the background region may indicate a region other than the ROI in the event frame.

The processor may extract the ROI other than the background region in the event frame, from the feature vector based on the machine learning algorithm.

In operation 1222, the processor computes an optical flow corresponding to the ROI. For example, the processor may compute the optical flow based on at least one map element included in the ROI. In this example, the processor may compute the optical flow based on a map element corresponding to a centroid of the at least one map element included in the ROI.

In operation 1223, the processor senses a movement of an external object based on the computed optical flow. As an example, the processor may compute, for example, a moving distance, a moving direction, and a moving velocity of the ROI based on the computed optical flow. In this example, the computed moving distance, moving direction, and moving velocity may be used as a moving distance, a moving direction, and a moving velocity of the external object.

Figure 13:
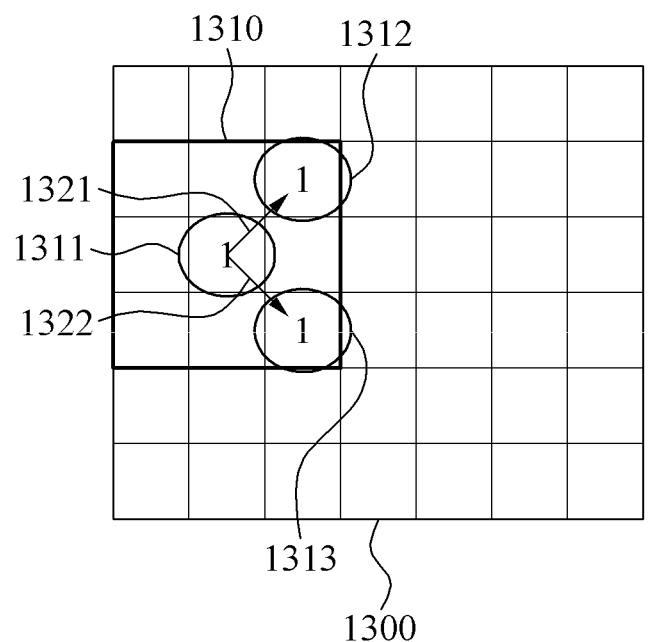

FIG. 13 illustrates a feature vector computed based on an event map 1300 according to an exemplary embodiment.

Referring to FIG. 13, the event map 1300 includes a plurality of map elements. A processor may sense a map element 1311 corresponding to a new event and map elements 1312 and 1313 corresponding to an existing event in an event occurring region 1310. In FIG. 13, a feature vector 1321 indicates a vector from the map element 1311 of the new event to the map element 1312 of the existing event. A feature vector 1322 indicates a vector from the map element 1311 of the new event to the map element 1313 of the existing event.

In this example, each of the feature vectors 1321 and 1322 may include an orientation angle and a gradient amplitude. The gradient amplitude of each of the feature vectors 1321 and 1322 may be expressed as, for example, (x-axial displacement+y-axial displacement)/(actual displacement). In this example, the actual displacement may indicate an actual distance between the map element 1311 of the new event and one of the map elements 1312 and 1313 of the existing event. As an example of the feature vector 1321, each of the x-axial displacement and the y-axial displacement may be "1", and the actual displacement may be "$\sqrt{2}$". Thus, the gradient amplitude of the feature vector 1321 may be computed as "$2/\sqrt{2}$".

The orientation angle may indicate an orientation angle between the map element 1311 of the new event and one of the map elements 1312 and 1313 of the existing event. For example, an orientation angle of the feature vector 1321 may be computed as 45°, and an orientation angle of the feature vector 1322 may be computed as −45°.

Figure 14:
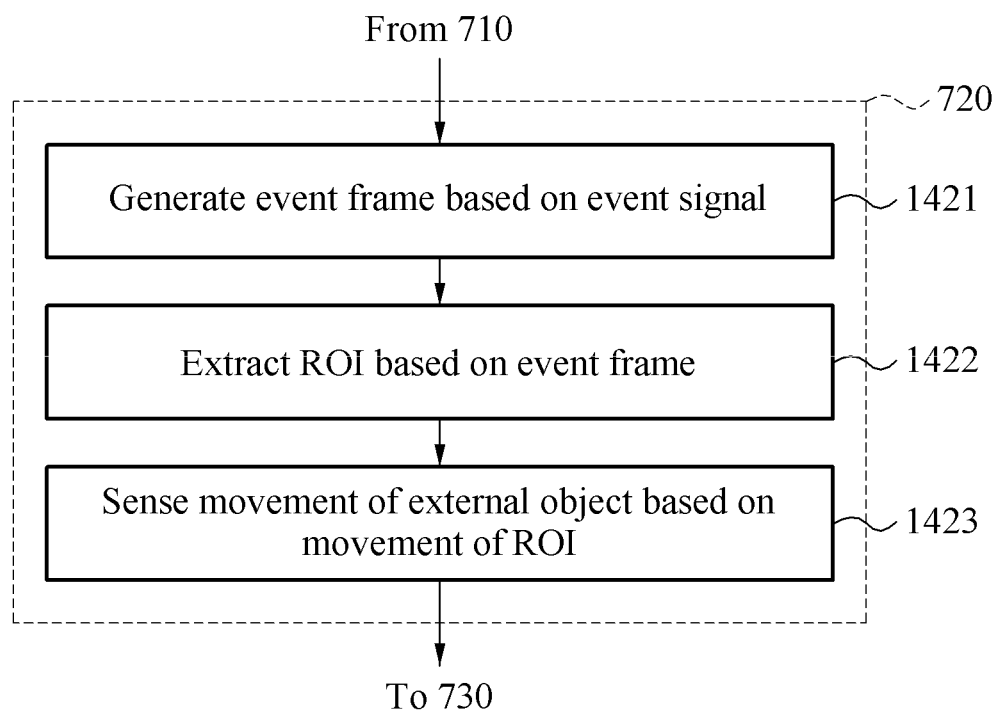

FIG. 14 is a flowchart illustrating a method of sensing a movement of an external object by computing a movement of an ROI.

In operation 1421, a processor generates an event frame based on an event signal. For example, the processor may generate the event frame by storing the event signal during a predetermined time window.

In operation 1422, the processor extracts an ROI based on the event frame. As an example, the processor may extract the ROI from the event frame based on a machine learning algorithm, for example, an SVM and an ANN.

In operation 1423, the processor senses a movement of an external object based on a movement of the ROI. As an example, the processor may compute, for example, a moving distance, a moving direction, and a moving velocity of the ROI extracted in operation 1422. For example, the processor may extract a centeroid of the ROI, and sense a movement of the centeroid. In this example, the centeroid may be average coordinates of map elements corresponding to an event occurring in the ROI.

Figure 15:
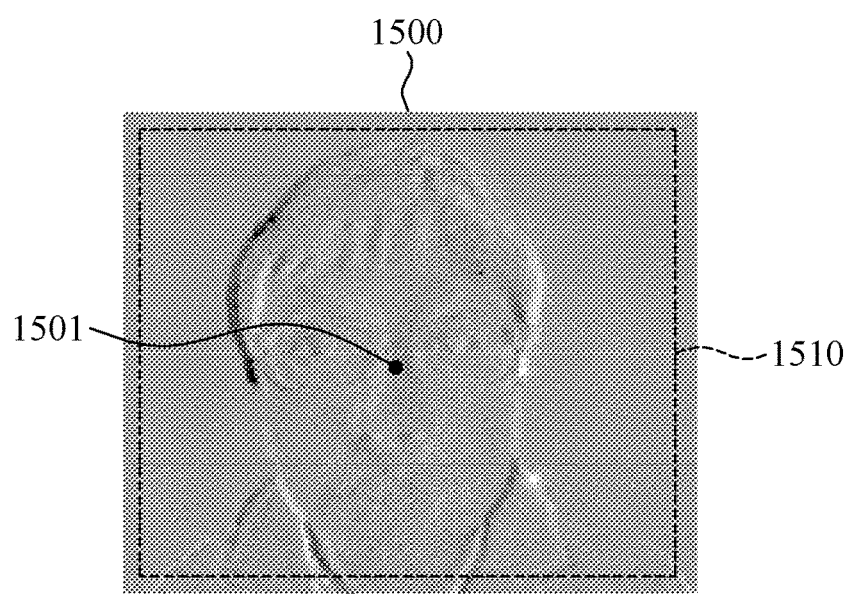

FIG. 15 illustrates an event frame 1500.

The event frame 1500 indicates a set of at least one event occurring during a predetermined time window. As illustrated in FIG. 15, the event frame 1500 includes map elements corresponding to the at least one event occurring during the predetermined time window. However, a set of map elements corresponding to an event occurring in a shape of a face is not limited as illustrated in FIG. 15. A set of map elements may be represented in, for example, a shape in which points are arranged along an outline of an external object.

The processor may identify an ROI 1510 based on a machine learning algorithm with reference to FIG. 15. Also, from the ROI 1510, the processor may extract a center point 1501 of map elements corresponding to a target sensing element outputting an event signal in the event frame.

Figure 16:
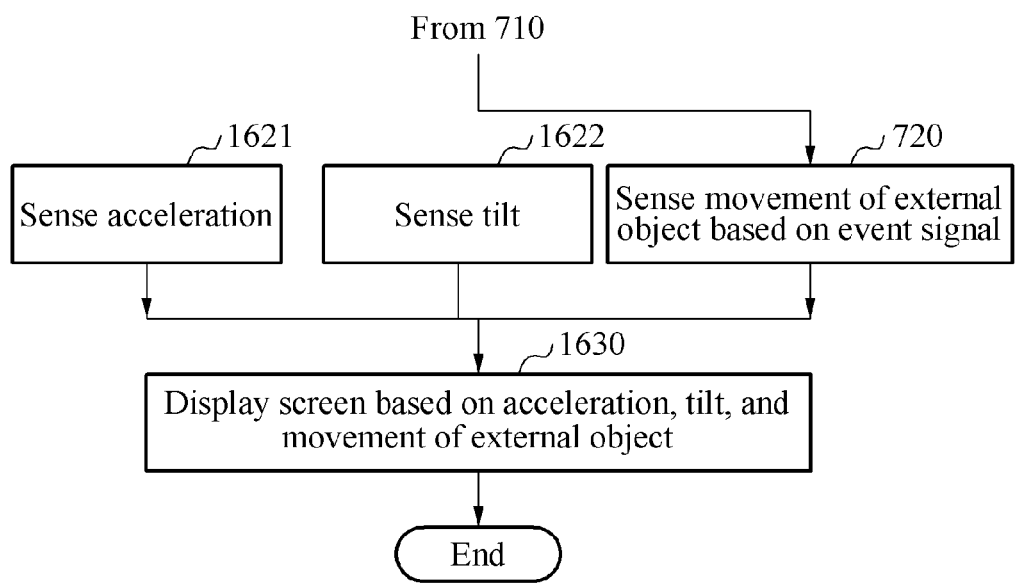
FIG. 16 is a flowchart illustrating a method of displaying a screen display according to an exemplary embodiment.

FIG. 16 is a flowchart illustrating a method of displaying a screen according to an exemplary embodiment.

In operation 720, as described above, a processor senses a movement of an external object based on an event signal.

In operation 1621, an acceleration sensor senses acceleration. The acceleration sensor may sense acceleration of an apparatus for displaying a screen in response to an event related to a motion of the external object. For example, the acceleration sensor may sense acceleration for three axes or acceleration for six axes. However, a number of axes and an axial direction for the acceleration is not limited to the foregoing and thus, may be changed based on a design.

In operation 1622, a tilt sensor senses a tilt. The tilt sensor may sense a tilt of the apparatus for displaying the screen in response to an event related to the motion of the external object. In this example, the tilt may indicate, for example, a degree to which the apparatus is tilted relative to a ground surface. Also, the tilt may indicate a degree to which the screen is tilted.

In operation 1630, the processor displays the screen based on the acceleration, the tilt, and the movement of the external object.

As an example, the processor may subtract a velocity determined based on the acceleration sensed in operation 1621, from a velocity vector of the external object sensed based on the event signal, thereby computing a relative velocity of the external object to the apparatus. The velocity may be determined, for example, by multiplying an average time difference to the acceleration. The processor may control a display to display the screen by moving the screen to correspond to a displacement computed based on the relative velocity.

Also, the processor may compute a tilt of an ROI extracted from the event signal, and subtract the tilt sensed in operation 1622 from the tilt of the ROI, thereby determining a tilt of the screen to be displayed.

In an example, the processor may sense the acceleration of the apparatus to compensate for an error due to self-acceleration of the apparatus, and sense the tilt of the apparatus to compensate for an error due to a self-tilt of the apparatus. The apparatus for displaying the screen in response to an event related to the movement of the object may calibrate the screen based on the self-acceleration and the self-tilt of the apparatus, thereby reducing a visual fatigue of the user.

Figure 17:
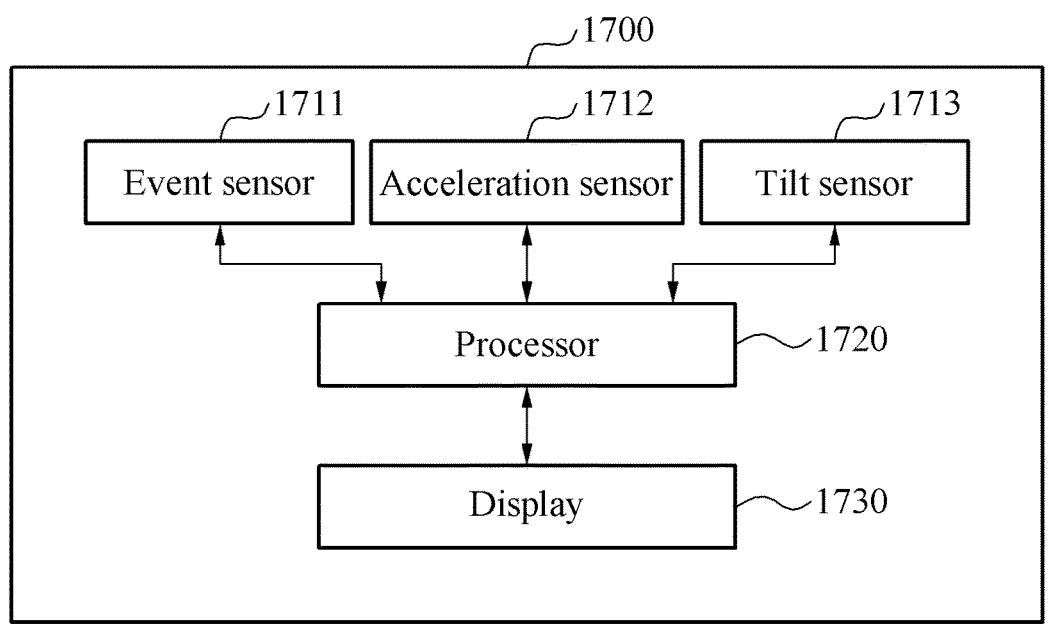
FIG. 17 is a block diagram illustrating an apparatus for displaying a screen in response to an event related to a motion of an external object according to another exemplary embodiment.

FIG. 17 is a block diagram illustrating an apparatus 1700 for displaying a screen in response to an event related to a motion of an external object according to another exemplary embodiment.

The apparatus 1700 includes an event sensor 1711, an acceleration sensor 1712, a tilt sensor 1713, a processor 1720, and a display 1730.

The event sensor 1711 outputs an event signal by sensing an event through a sensing element similarly to the event sensor 610 of FIG. 6. The acceleration sensor 1712 senses an acceleration of the apparatus 1700. The tilt sensor 1713 senses a tilt of the apparatus 1700.

The processor 1720 senses a movement of an external object based on the output event signal, similarly to the processor 620 of FIG. 6.

The display 1730 displays a screen based on the movement of the external object, similarly to the display 630 of FIG. 6, and further based on the acceleration and the tilt, similarly to the method of FIG. 16.

Although FIG. 17 illustrates the apparatus 1700 including the acceleration sensor 1712 and the tilt sensor 1713, a type of sensor is not limited thereto. Instead, any type of sensor configured to provide information of a motion and a motion state of the apparatus 1700 is applicable thereto.

Figure 18:
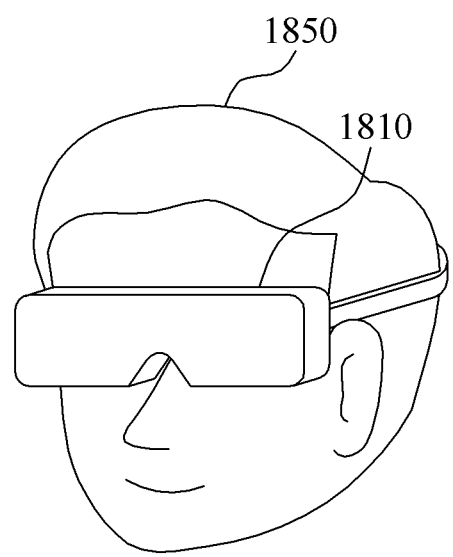
FIG. 18 is a diagram illustrating an apparatus for displaying a screen in response to an event related to a motion of an external object according to an exemplary embodiment.

FIG. 18 is a diagram illustrating an apparatus 1810 for displaying a screen in response to an event related to a motion of an external object according to an exemplary embodiment.

Referring to FIG. 18, the apparatus 1810 for displaying a screen in response to an event related to a motion of an external object is applicable to a head-mounted display (HMD). For example, a display of the apparatus 1810 is an HMD mounted on a head of a user to provide the screen.

For example, the apparatus 1810 is mounted on the head of a user 1850 to provide the screen using an internal display. In this example, an event sensor may be disposed on an identical side or an opposite side to a display of the apparatus 1810.

In an example, the apparatus 1810 may sense a position of an eye of the user 1850 based on an event signal, and compute a positional movement of the head of the user 1850 relative to the apparatus 1810. In this example, the eye may be irrespective of a pupil. For example, in the aforementioned method of FIG. 7, a movement of the eye may be sensed as the movement of the external object, and the positional movement of the head may be estimated based on the movement of the eye. The apparatus 1810 may display the screen by moving the screen based on the position of the eye, thereby reducing a visual fatigue. However, the disclosure is not limited thereto. The apparatus 1810 may reduce the visual fatigue by, for example, magnifying the screen.

In another example, the event sensor may be disposed on the opposite side to the display of the apparatus 1810. Through this, the event sensor may sense a change in an intensity of light received from the external object, and output an event signal. The apparatus 1810 may sense, for example, a trajectory of a feature point and a change in an optical flow computed based on the change in the intensity of light received from the external object when the user 1850 moves the head or a body, thereby computing the positional movement of the head of the user 1850.

In still another example, the apparatus 1810 may sense a position and a positional movement of a pupil of the user 1850 based on an event signal, to track a line of sight of the user 1850. The apparatus 1810 may display the screen by magnifying the screen based on the line of sight tracked for each position of the pupil, thereby reducing the visual fatigue. However, the disclosure is not limited thereto. Instead, the apparatus 1810 may reduce the visual fatigue by, for example, moving the screen.

Although the eye and the pupil are used as examples of the external object to be applied to the HMD, a type of the external object is not limited thereto. The apparatus 1810 may also sense, for example, a portion, for example, an eyebrow, a lip, and a nose, of a face of the user 1850 as the external object.

According to an aspect of the exemplary embodiment, it is possible to provide a screen to a user using a mobile device, for example, a smartphone, a tablet PC, and an HMD, in a process of moving, thereby reducing a visual fatigue of the user. For example, when the user carrying the mobile device moves, a display of the mobile device may be controlled based on a motion of the user such that the user may avoid experiencing the visual fatigue and dizziness.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A method for displaying a screen, the method being performed by an apparatus, and the method comprising:
sensing, by an event sensor, a motion of an external object that is external to the apparatus, based on a change of an intensity of light incident on the event sensor;
generating, by the event sensor, an event signal, in response to the motion of the external object being sensed;
sensing, by a processor, a moving velocity of the external object relative to the apparatus, based on the event signal;
displaying, by a display, the screen;
controlling, by the processor, the display to move the screen that is displayed, in response to the moving velocity of the external object being sensed to be less than or equal to a threshold velocity; and
controlling, by the processor, the display to magnify a region of the screen, in response to the moving velocity of the external object being sensed to greater than the threshold velocity.

2. The method of claim 1, further comprising determining, by the processor, any one or any combination of a first moving direction, a first moving distance, and a moving velocity of the screen, based on any one or any combination of a second moving direction, a second moving distance, and the moving velocity of the external object.

3. The method of claim 1, further comprising controlling, by the processor, the display to display the screen, based on a number of times that the external object is shaken during a period of time.

4. The method of claim 1, wherein the generating comprises generating a first event signal and a second event signal, in response to the motion of the external object being sensed, and
wherein the sensing comprises:
generating an event map comprising a first map element that comprises a first time at which the first event signal is generated by a first sensing element of the event sensor, and comprising a second map element that comprises a second time at which the second event signal is generated by a second sensing element of the event sensor;
determining a time difference between the first time and the second time and a distance difference between a first position of the first map element and a second position of the second map element;
determining an optical flow comprising a velocity vector, based on the time difference and the distance difference; and
sensing the moving velocity of the external object, based on the optical flow.

5. The method of claim 1, wherein the sensing comprises:
generating an event frame by storing the event signal during a time window;
extracting a region of interest (ROI) from the event frame;
determining an optical flow corresponding to the ROI; and
sensing the moving velocity of the external object, based on the optical flow.

6. The method of claim 1, wherein the sensing comprises:
generating an event frame by storing the event signal during a time window;
extracting a region of interest (ROI) from the event frame; and
sensing the moving velocity of the external object, based on a movement of the ROI.

7. The method of claim 1, further comprising:
sensing, by an acceleration sensor, an acceleration of the apparatus;
sensing, by a tilt sensor, a tilt of the apparatus; and
controlling, by the processor, the display to display the screen, based on the acceleration, the tilt, and the moving velocity of the external object.

8. A non-transitory computer-readable recording medium that stores a program that is executable by a computer to perform the method of claim 1.

9. An apparatus for displaying a screen, the apparatus comprising:
an event sensor configured to:
sense a motion of an external object that is external to the apparatus, based on a change of an intensity of light incident on the event sensor; and
generate an event signal, in response to the motion of the external object being sensed;
a processor configured to sense a moving velocity of the external object relative to the apparatus, based on the event signal; and
a display configured to display the screen,
wherein the processor is further configured to:
control the display to move the screen that is displayed, in response to the moving velocity of the external object being sensed to be less than or equal to a threshold velocity; and
control the display to magnify a region of the screen, in response to the moving velocity of the external object being sensed to greater than the threshold velocity.

10. The apparatus of claim 9, wherein the processor is further configured to control the display to display the screen, based on a number of times that the external object is shaken during a period of time.

11. The apparatus of claim 9, wherein the event sensor comprises a first sensing element configured to generate a first event signal, in response to the motion of the external object being sensed, and comprises a second sensing element configured to generate a second event signal, in response to the motion of the external object being sensed, and
wherein the processor is further configured to:
generate an event map comprising a first map element that comprises a first time at which the first event signal is generated by the first sensing element, and comprising a second map element that comprises a second time at which the second event signal is generated by the second sensing element;
determine a time difference between the first time and the second time and a distance difference between a first position of the first map element and a second position of the second map element;
determine an optical flow comprising a velocity vector, based on the time difference and the distance difference; and
sense the moving velocity of the external object, based on the optical flow.

12. The apparatus of claim 9, wherein the processor is further configured to:
generate an event frame by storing the event signal during a time window;
extract a region of interest (ROI) from the event frame;

determine an optical flow corresponding to the ROI; and sense the moving velocity of the external object, based on the optical flow.

13. The apparatus of claim 9, wherein the processor is further configured to:

generate an event frame by storing the event signal during a time window;

extract a region of interest (ROI) from the event frame; and sense the moving velocity of the external object, based on a movement of the ROI.

14. The apparatus of claim 9, further comprising:

an acceleration sensor configured to sense an acceleration of the apparatus; and a tilt sensor configured to sense a tilt of the apparatus, wherein the processor is further configured to control the display to display the screen, based on the acceleration, the tilt, and the moving velocity of the external object.

15. The apparatus of claim 9, wherein the display is a head mounted display configured to be mounted on a head of a user to display the screen.

16. A method for displaying a screen, the method being performed by an apparatus, and the method comprising:

generating a first event signal and a second event signal, in response to a motion of an external object being sensed;

generating an event map comprising a first map element that comprises a first time at which the first event signal is generated by a first sensing element of an event sensor, and comprising a second map element that comprises a second time at which the second event signal is generated by a second sensing element of the event sensor;

determining a time difference between the first time and the second time and a distance difference between a first position of the first map element and a second position of the second map element;

determining an optical flow comprising a velocity vector, based on the time difference and the distance difference;

sensing a moving velocity of the external object relative to the apparatus, based on the optical flow;

displaying, by a display, the screen; and controlling the display to move the screen that is displayed, in response to the moving velocity of the external object being sensed to be less than or equal to a threshold velocity.

* * * * *